United States Patent
Schwindt et al.

(10) Patent No.: US 10,217,364 B2
(45) Date of Patent: Feb. 26, 2019

(54) LANE ASSISTANCE SYSTEM RESPONSIVE TO EXTREMELY FAST APPROACHING VEHICLES

(71) Applicant: Robert Bosch GmbH, Stuttgart (DE)

(72) Inventors: Oliver Schwindt, Palo Alto, CA (US);
Kevin Buckner, Macomb, MI (US);
Bhavana Chakraborty, Novi, MI (US);
Raphael Hellinger, Novi, MI (US);
Thomas Voorheis, Wayne, MI (US)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 15/526,002

(22) PCT Filed: Nov. 17, 2015

(86) PCT No.: PCT/US2015/061137
§ 371 (c)(1),
(2) Date: May 11, 2017

(87) PCT Pub. No.: WO2016/081488
PCT Pub. Date: May 26, 2016

(65) Prior Publication Data
US 2018/0025645 A1    Jan. 25, 2018

Related U.S. Application Data

(60) Provisional application No. 62/081,129, filed on Nov. 18, 2014.

(51) Int. Cl.
*G08G 1/16* (2006.01)
*G01S 13/93* (2006.01)
(Continued)

(52) U.S. Cl.
CPC ............ *G08G 1/167* (2013.01); *G01S 13/931* (2013.01); *G08G 1/0112* (2013.01);
(Continued)

(58) Field of Classification Search
CPC ................. G08G 1/167; G08G 1/0112; G08G 1/096708; G08G 1/166; G01S 13/931
See application file for complete search history.

(56) References Cited

U.S. PATENT DOCUMENTS 5,913,375 A    6/1999  Nishikawa
6,654,671 B2  11/2003  Schubert
(Continued)

FOREIGN PATENT DOCUMENTS

DE    102012216422 A1   3/2014
EP         2295311 B1    3/2011
(Continued)

OTHER PUBLICATIONS

Office Action from the Japanese Patent Office for Application No. 2017-526859 dated May 28, 2018 (6 pages).
(Continued)

*Primary Examiner* — Michael D Lang
(74) *Attorney, Agent, or Firm* — Michael Best & Friedrich LLP (57) ABSTRACT

A lane assistance system of a host vehicle for reacting to fast and extremely fast approaching vehicles includes a rear radar sensing unit having a sensor and an electronic controller. The electronic controller determines the distance and relative velocity of the fast approaching vehicle to the host vehicle. Further, depending on the closeness of the approaching vehicle, the lane of the approaching vehicle is determined from angular resolution of the radar signal. When the vehicle is approaching at an extremely fast rate and the angular resolution of the radar signal is not capable of determining an exact relative lane of the approaching vehicle due to the vehicle being too far away, the assistance system warns against or prevents lane changes by the host vehicle.

20 Claims, 7 Drawing Sheets

(51) Int. Cl.
*G08G 1/01* (2006.01)
*G08G 1/0967* (2006.01)
*G01S 7/00* (2006.01)

(52) U.S. Cl.
CPC ....... *G08G 1/096708* (2013.01); *G08G 1/166* (2013.01); *G01S 7/003* (2013.01); *G01S 2013/9353* (2013.01); *G01S 2013/9367* (2013.01); *G01S 2013/9378* (2013.01)

(56) References Cited

U.S. PATENT DOCUMENTS

| | | |
|---|---|---|
| 8,593,333 B2 | 11/2013 | Wintermantel et al. |
| 2006/0253239 A1 | 11/2006 | Williams |
| 2007/0296564 A1 | 12/2007 | Howell et al. |
| 2009/0102629 A1 | 4/2009 | Kaller et al. |
| 2009/0143944 A1 | 6/2009 | Park |
| 2010/0117813 A1 | 5/2010 | Lee |
| 2011/0291874 A1 | 12/2011 | DeMersseman |
| 2013/0057397 A1 | 3/2013 | Cutler et al. |
| 2013/0181860 A1 | 7/2013 | Le et al. |
| 2016/0101729 A1* | 4/2016 | Burke .................. G01S 13/931 701/36 |

FOREIGN PATENT DOCUMENTS

| | | |
|---|---|---|
| JP | H08185599 A | 7/1996 |
| JP | H09132094 A | 5/1997 |
| JP | H1142989 A | 2/1999 |
| JP | 2005219712 A | 8/2005 |
| JP | 2009067334 A | 4/2009 |
| WO | 2010064963 A1 | 12/2008 |
| WO | 2013186925 A1 | 12/2013 |

OTHER PUBLICATIONS

International Search Report and Written Opinion for Application No. PCT/US2015/061137 dated Feb. 9, 2016, pp. 252—(11 pages).
"Rear Vehicle Detection and Tracking for Lane Change Assist", Wei Liu et al., Proceedings of the 2007 IEEE Intelligent Vehjicles Symposium, Istanbul, Turkey, Jun. 13-15, 2007, pp. 252-257 (6 pages).

* cited by examiner

LANE ASSISTANCE SYSTEM RESPONSIVE TO EXTREMELY FAST APPROACHING VEHICLES

BACKGROUND

The present invention relates to a lane assistance system for sensing rapidly approaching vehicles from the rear of a vehicle to avoid inopportune lane changes.

Today, rear radar sensors are used for functions, such as blind-spot detection, rear cross traffic alert and closing vehicle warning. For closing or rearwardly approaching vehicle warning functions, systems must meet the ISO17387 norm, which requires that vehicles approaching at a velocity that is 20 meters/second (45 miles per hour (mph)/72 kilometers per hour (kph)) faster than the velocity of a host vehicle, result in a warning for the host vehicle. The warning must occur 3.5 seconds before the closing rearwardly approaching vehicle overtakes the host vehicle.

For all variants of automated driving which allow lane changes, it is important to identify if a subject vehicle on a neighboring lane is approaching extremely quickly, such that a lane change that could be potentially dangerous is not performed by the host vehicle. Unfortunately, today's systems, which are designed to meet a 3.5 second warning of a vehicle approaching a host vehicle from the rear at a relative velocity of 20 m/sec., typically cannot accurately sense a large enough distance rearwardly. Thus, the arrangement is not suitable for autonomous driving applications, as the system cannot provide the information fast enough for vehicles approaching extremely fast.

Some high relative velocity difference scenarios addressed herein are as follows.

On highways, e.g. German Autobahn for example, it is common on certain stretches that cars travelling at 250 kph overtake vehicles travelling at 80 kph. A common accident source is an operator driving a vehicle that is changing lanes behind trucks travelling at 80 kph to pass, not realizing that vehicles on the neighboring lane are approaching very quickly. Although this situation is not typical in some countries, there are additional situations when people speed considerably that need to be considered.

In highway traffic jam situations, occasionally a host vehicle is in a lane travelling slowly (e.g. 10 kph), but vehicles in a neighboring lane are travelling near the speed limit (e.g. 130 kph in many countries).

In city/city-expressway/country-road situations, vehicles in different lanes typically travel at different speeds. Lane changes and lane mergers by a host vehicle travelling at very low speeds to lanes where higher speeds are allowed (e.g. 100 kph) are also common, such that autonomous driving must be able to perform under such conditions.

In current implementations of radar sensing units, the radar sensing unit typically searches for peaks in the received spectrum, and translates the peaks into a measured distance and velocity, wherein high power was received off of reflections of objects. At this data point, angles of the objects with respect to the host vehicle orientation are also calculated.

However, when the angles of objects/vehicles relative to the host vehicle are not determinable or very uncertain, the measurements get rejected. Thus, the position of the approaching object is unknown and no action can be taken.

In other instances, values for the angles of objects relative to the host vehicle are obtained, but due to the large distance of the object from the host vehicle, the objects have a distribution that covers multiple lanes, such that there is no possibility of associating the detected vehicle to a specific lane. This event leads to missed or false interpretations of what lane the fast approaching object is in.

The objective of the invention is to identify when a vehicle is approaching extremely quickly from the rear of a host vehicle at a high relative velocity, such that a lane change by the host vehicle that may potentially be dangerous can be prevented, even when the specific lane of the closing rearwardly approaching vehicle is not certain.

SUMMARY

In one embodiment of the invention, a rear sensor unit plays a role in providing a surround view for autonomous driving or for partially autonomous driving, that is typically limited to highways, traffic jams or other designated areas.

In another embodiment of the invention, a lane assistance system provides warnings and/or vehicle control in response to the sensing of fast rearwardly approaching vehicles.

In another embodiment of the invention, the rear radar sensing unit determines the presence and relative velocity of an extremely fast rearwardly approaching vehicle at distances beyond what rear sensor units currently utilize for providing warnings. For distances beyond what the angle and thus the lane of an extremely fast rearwardly approaching vehicle are calculable, a warning is provided or lane switching is impeded when the relative velocity is beyond a predetermined extremely fast relative velocity threshold.

In one embodiment of the invention, a lane assistance system for providing an output in response to a rearwardly approaching vehicle nearing a host vehicle comprises: at least one rear sensor unit disposed proximate to a rear of the host vehicle, the at least one rear sensor unit configured to detect at least one of a distance and a velocity of a rearwardly approaching vehicle moving toward the host vehicle. The system includes an electronic controller configured to obtain host vehicle velocity information, obtain at least one of a distance and a velocity of a rearwardly approaching vehicle, determine a relative velocity of a rearwardly approaching vehicle in relation to the host vehicle, and when a roadway lane of a rearwardly approaching vehicle is obtained via the at least one rear sensor unit and upon determining that (a) a rearwardly approaching vehicle is within at least one neighboring lane on either side of a host vehicle lane that the host vehicle is traveling in, and (b) the relative velocity indicates a rearwardly approaching vehicle is approaching the host vehicle at or greater than a fast relative velocity threshold, providing a fast rearwardly approaching vehicle output, and when a roadway lane of a rearwardly approaching vehicle is not determinable due to a lack of angular resolution for the rear sensor unit and upon determining that a rearwardly approaching vehicle has a relative velocity that is at or greater than an extremely fast relative velocity threshold, providing an extremely fast rearwardly approaching vehicle output.

In one embodiment, the electronic controller is provided within the rear sensor unit that includes a rear radar sensor for sensing a velocity of a rearwardly approaching vehicle, and the lack of angular resolution occurs when a rearwardly approaching vehicle is beyond a particular distance from the host vehicle.

In one embodiment, the fast rearwardly approaching vehicle output and the extremely fast rearwardly approaching vehicle output are provided to a warning unit for providing a warning to an operator of the host vehicle in response to the fast rearwardly approaching vehicle output or the extremely fast rearwardly approaching vehicle output.

In one embodiment, the warning comprises at least one of an acoustic warning and a visual warning, and in response to the fast rearwardly approaching vehicle output, the warning indicates a particular lane change that must be avoided.

In one embodiment, in response to the extremely fast rearwardly approaching vehicle output, the warning indicates that a lane change is inappropriate.

In one embodiment, the electronic controller is a central controller that determines autonomous control of the host vehicle in response to the fast rearwardly approaching vehicle output or the extremely fast rearwardly approaching vehicle output, and other information from the host vehicle.

In one embodiment, the at least one rear sensor unit is a left rear sensor unit and the assistance system includes a right rear sensor unit.

In one embodiment, the left rear sensor unit and the right rear sensor unit are lidar rear sensor units that determine a distance of a rearwardly approaching vehicle from the host vehicle, and the electronic controller determines the relative velocity from detected changes in distance between the host vehicle and a rearwardly approaching vehicle.

In another embodiment, the extremely fast relative velocity threshold is at least about 45 miles per hour and the fast relative velocity threshold is a threshold value between about 10 miles per hour and about 25 miles per hour.

In another embodiment of the invention, a method for providing an output in response to a rearwardly approaching vehicle nearing a host vehicle, the method comprises: obtaining at least one of a distance and a velocity of a rearwardly approaching vehicle; determining a relative velocity of a rearwardly approaching vehicle in relation to the host vehicle; when a roadway lane of a rearwardly approaching vehicle is obtained via the at least one rear sensor unit, providing a fast rearwardly approaching vehicle output upon determining that a rearwardly approaching vehicle is within at least one neighboring lane on either side of a host vehicle lane that the host vehicle is driving in and that the relative velocity indicates the rearwardly approaching vehicle is approaching the host vehicle at or greater than a fast relative velocity threshold; and when a roadway lane of a rearwardly approaching vehicle is not determinable due to a lack of angular resolution for the rear sensor unit, providing an extremely fast rearwardly approaching vehicle output upon determining that a rearwardly approaching vehicle has a relative velocity that is at or greater than an extremely fast relative velocity threshold.

In one embodiment, the method includes obtaining host vehicle velocity information, and wherein obtaining at least one of a distance and a velocity of a rearwardly approaching vehicle is provided by a rear radar sensor unit, and the angular resolution for the rear sensor unit is not determinable when a rearwardly approaching vehicle is beyond a particular distance from the host vehicle.

In another embodiment, the method includes providing autonomous control of the host vehicle in response to the fast rearwardly approaching vehicle output or the extremely fast rearwardly approaching vehicle output.

In another embodiment, the method includes preventing the host vehicle from performing a lane change into either adjacent lane in response to the extremely fast rearwardly approaching vehicle output.

In another embodiment, the method includes preventing the host vehicle from performing a lane change into at least one of the two adjacent lanes in response to the fast rearwardly approaching vehicle output.

In another embodiment, the method includes determining an augmented chance of collision and with the autonomous control preventing a lane change into at least one adjacent lane of the roadway regardless of any other condition.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
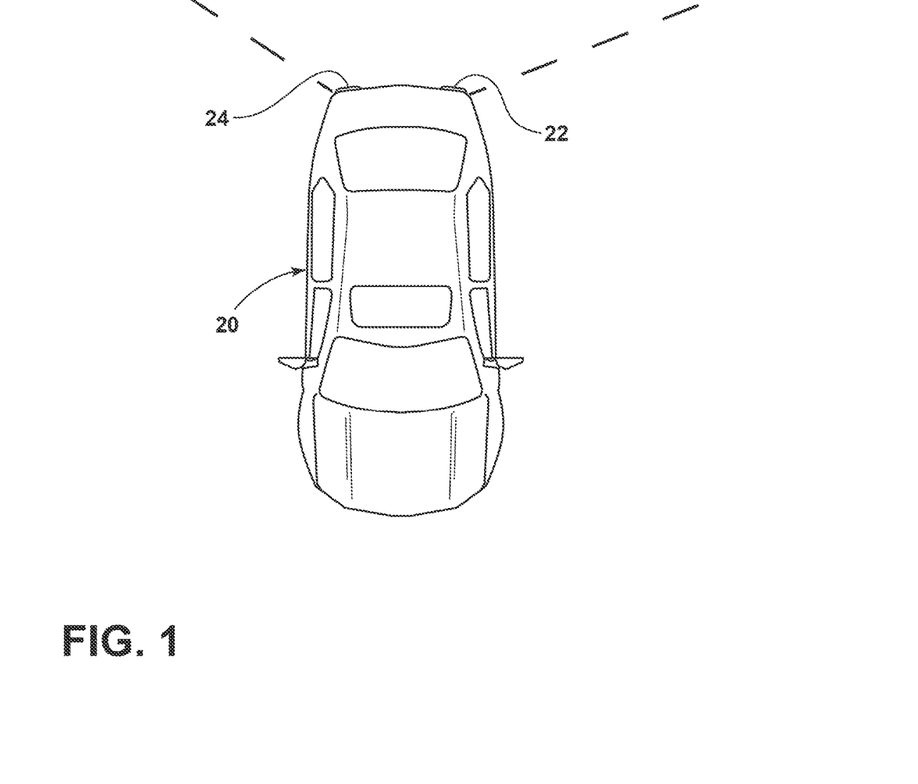
FIG. 1 shows a top view of a vehicle that includes rear sensor units.
Figure 2:
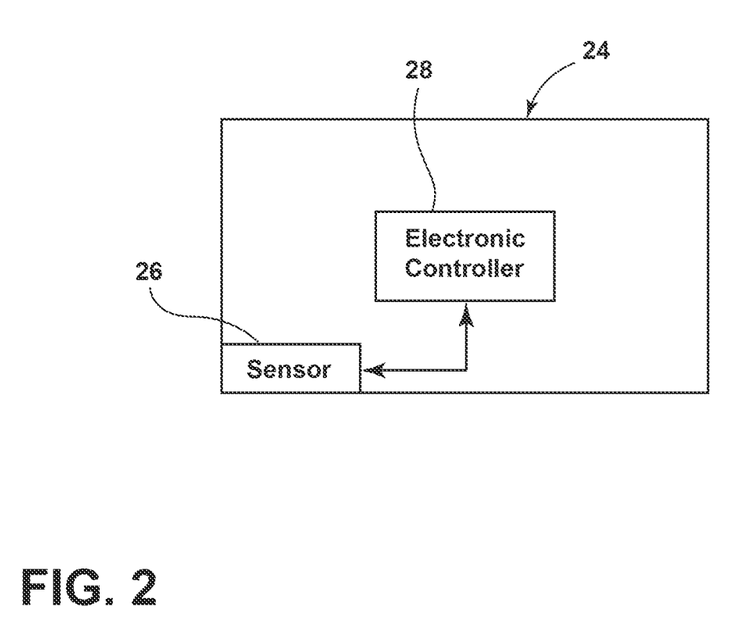
FIG. 2 is a block diagram of a rear sensor unit.

FIG. 1 shows a host vehicle 20 that includes rear sensor units 22, 24 disposed thereon. The rear sensor units 22, 24 define a field-of-view for sensing within. The field of view is capable of a wide range of values. A field of view of 150 degrees is typically the largest value. The rear sensor units are disposed proximate to the rear of the host vehicle 20. FIG. 2 shows the rear sensor unit 24 that includes a sensor 26 and an electronic controller 28. In some embodiments, the rear sensor unit 22 shown in FIG. 1 is identical to the rear sensor unit 24 shown in FIG. 2. In some embodiments, the rear sensor units 22, 24 are radar rear sensor units and the sensors 26 are radar sensors. The radar sensors 26 detect the velocity of a rearwardly approaching vehicle. The radar rear sensor units 22, 24 provide the velocity and the distance of an approaching vehicle. In another embodiment, a first rear sensor unit 22 and a second rear sensor unit 24 are light detection and ranging (Lidar) rear sensor units and the corresponding sensors 26 are Lidar sensors. Lidar sensors of lidar rear sensor units typically detect and measure distance, which can be compared over time to determine a velocity.

In some constructions, the electronic controller 28 of the rear sensor unit 24 includes a processor that has an executable program stored in a memory, such as a read only memory (ROM). The electronic controller 28 also includes a random access memory (RAM) for storing information that is received through the communication bus 48. Non-transitory computer readable memory of the electronic controller 28 include volatile memory, non-volatile memory, or a combination thereof and, in various constructions, may also store operating system software, applications/instructions data, and combinations thereof.

Figure 3:
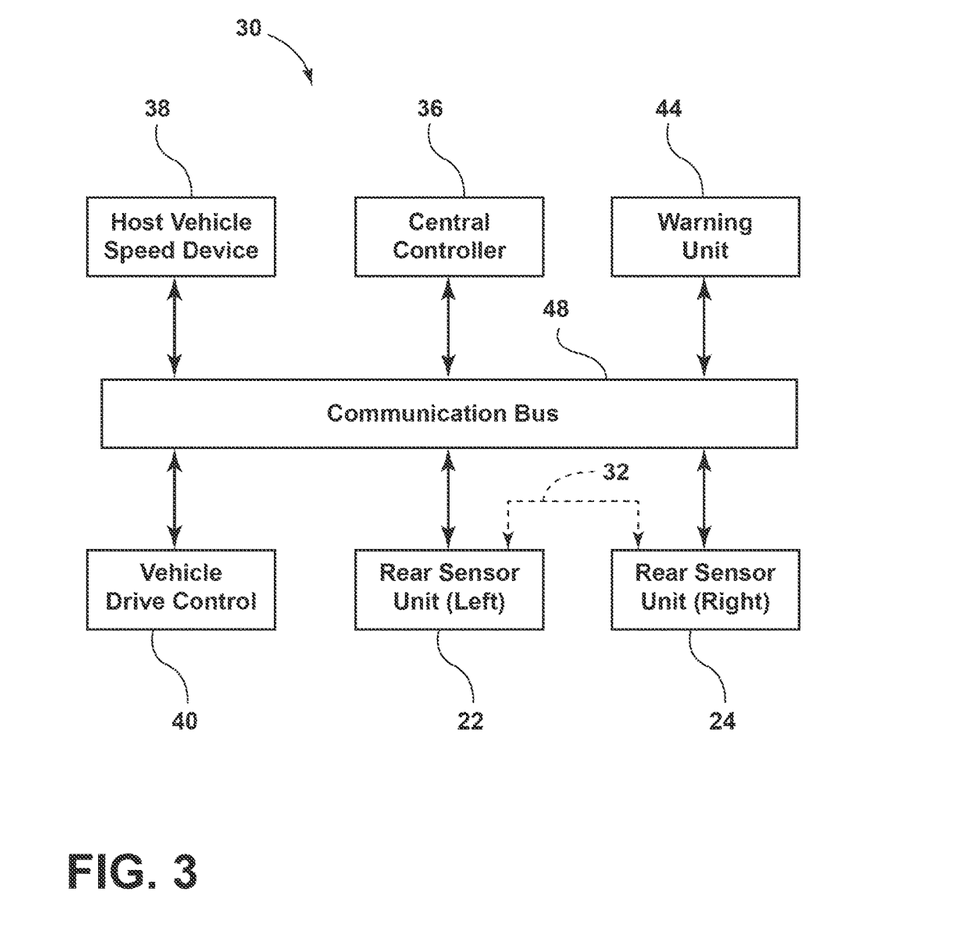
FIG. 3 is a block diagram of a lane assistance system for controlling autonomous lane changes.

The embodiment of FIG. 3 shows a lane assistance system 30 for autonomous vehicles or vehicles with an autonomous operating mode. The lane assistance system 30 includes a left rear sensor unit 22 and a right rear sensor unit 24. In some embodiments a communication link 32 shown by broken line is provided between the left rear sensor unit 22 and a right rear sensor unit 24. The communication link 32 is either a wired or wireless connection. Further, FIG. 3 shows a central controller 36, a host vehicle speed device 38, and a vehicle drive control 40. In one embodiment, the central controller 36 is a main operating processor for calculating various conditions of a vehicle. In one embodiment, the host vehicle speed device 38 is a vehicle speed sensor. In another embodiment, the, the host vehicle speed device 38 is a vehicle speed signal taken from an electronic stability control. The vehicle drive control 40 is an arrangement for driving a vehicle 20 autonomously or to provide driving assistance in certain instances. In some embodiments, a warning unit 44 is also provided. The warning unit 44 provides an acoustic and/or a visual warning to a user. In one embodiment, a loudspeaker provides an acoustic warning and a vehicle dashboard display or a heads up display provides a visual warning. A communication bus 48 provides communication between the central controller 36 and the rear sensor units 22, 24, along with the other devices and controls. In one embodiment, the communication bus 48 is a controller area network (CAN) bus. In another embodiment, the communication bus 48 is a Flex-ray bus. In yet another embodiment, the communication bus 48 is automotive Ethernet. In the embodiment wherein the left rear sensor unit 22 and the right rear sensor unit 24 are connected via the communication link 32, both of the rear sensor units 22, 24 do not need to be connected to the communication bus 48.

Operation of Lane Assistance for Autonomous Vehicle

Figure 4:
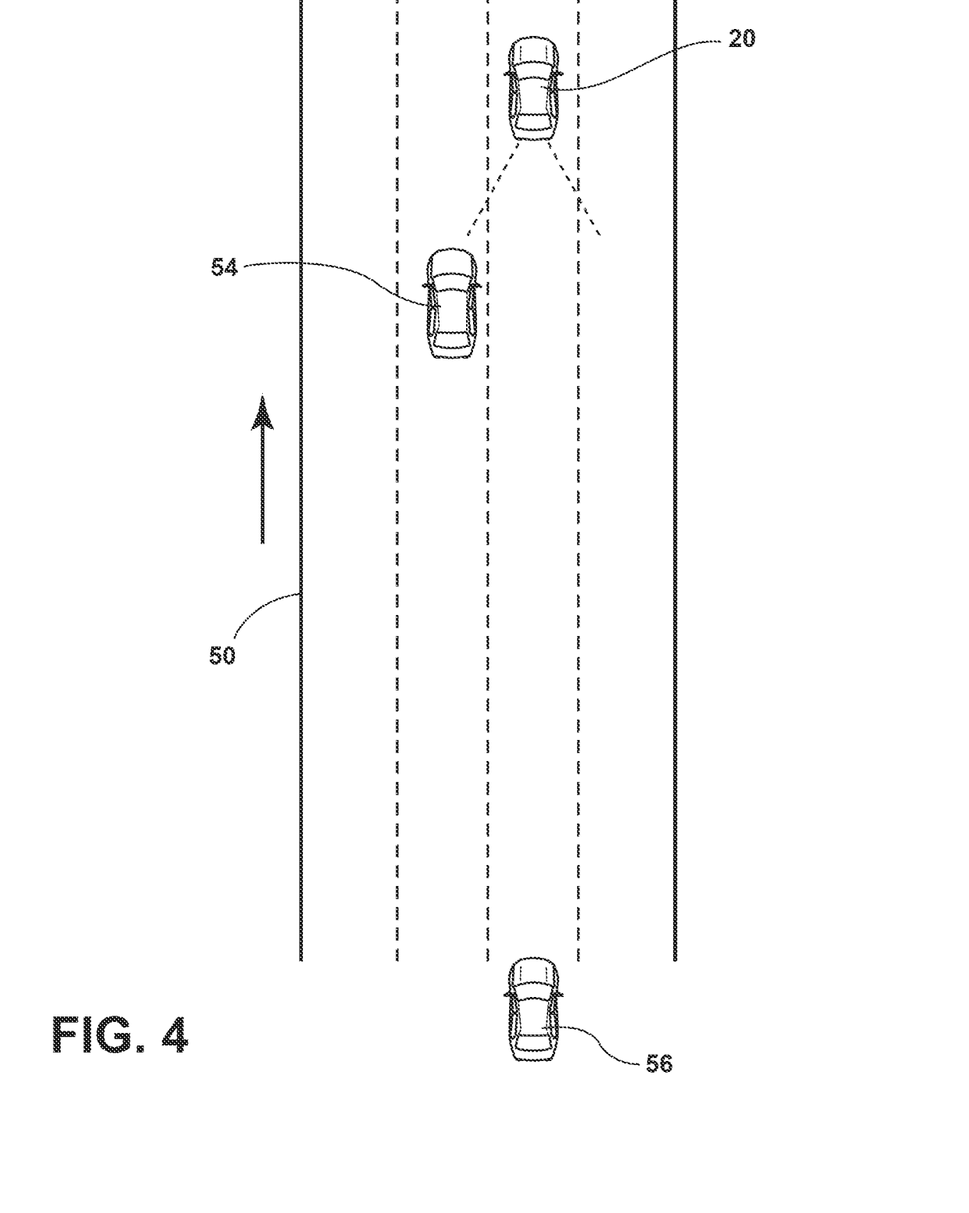
FIG. 4 is a flow chart for operation of the lane assistance system shown in FIG. 3.

FIG. 4 shows a roadway 50 including a plurality of lanes with a host vehicle 20 driving in the direction of an arrow. Further, a rearwardly approaching nearby vehicle 54 is shown in a left lane relative to the lane of the host vehicle 20. Further, a distant rearwardly approaching vehicle 56 is shown in the host vehicle lane located far away, rearwardly of the host vehicle 20.

In one embodiment, wherein the rear sensor units 22, 24 have rear radar sensors 26, the units are designed such that the reflection of radar waves off of fast approaching vehicles can occur in far distances, e.g. to 160 m or more from the host vehicle 20. Above a certain distance (e.g. 90 meters or whatever a lane-assignment is no longer reliable), there is no ability to properly calculate the angles of the fast approaching vehicles or determine what lane this vehicle is on, such as the distant rearwardly approaching vehicle 56 with respect to the host vehicle 20, as the angles would be too imprecise on typical antenna designs for a rear radar sensor 26. Since angular data is not available for far away objects, only the peak detection and conversion to distance/velocity data need is performed by an electronic controller. Thus, as long as the peaks are recognized in the minimum amount of channels available to calculate distance and velocity, the data is used (normally the data needs to be available in more channels to calculate angles to be useable).

Figure 5:
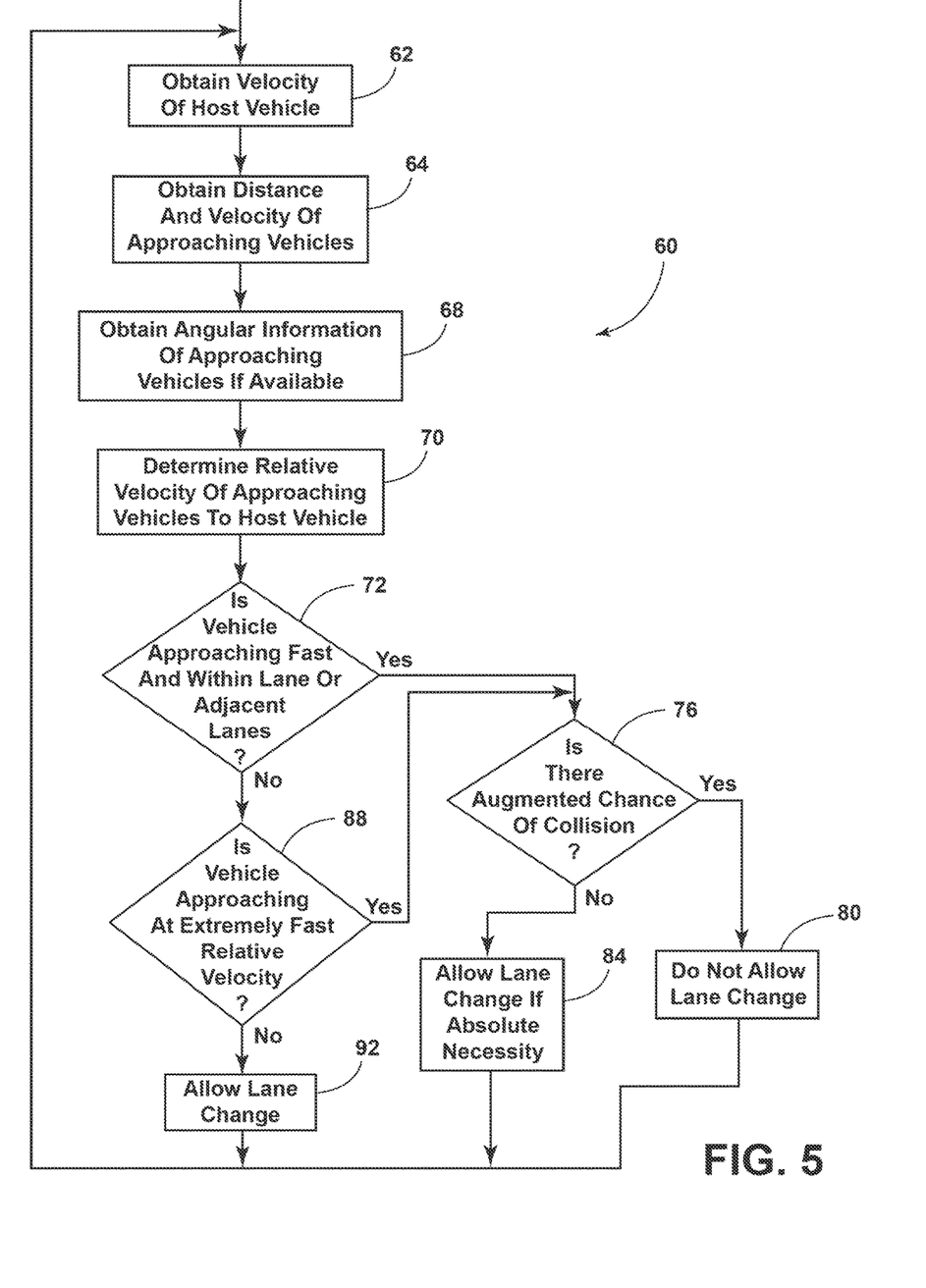
FIG. 5 is a top view of vehicles on a roadway for illustrating operation.

FIG. 5 is a flowchart 60 of a routine or program that executes an algorithm. Thus, FIG. 5 sets forth in detail a method for operating the central controller 36 to provide lane assistance with the lane assistance system 30 shown in FIG. 3. The central controller 36 is configured to execute an algorithm that determines the presence of a rearwardly approaching vehicle moving toward the host vehicle 20.

In a first step 62, the central controller 36 obtains or receives a velocity of the host vehicle 20 from the host vehicle speed device 38. The host vehicle speed device 38 is a velocity sensor, electronic stability control or other device that measures or calculates the host vehicle velocity. The central controller 36 obtains host vehicle velocity information. The program advances to step 64.

At step 64, at least one rear sensor unit 22, 24 senses velocity and/or distance of rearwardly approaching vehicles 54, 56 and provides signals to the corresponding electronic controller 28 that further calculates the distance or velocity, if necessary, and provides values for the distance or velocity to the central controller 36 via the communication bus 48. The program advances to step 68.

At step 68, the program determines angular information for the rearwardly approaching vehicles 54, 56 and, if possible, assigns a lane to the approaching vehicles. When there is a lack of angular resolution such that a proper angle is not available to determine a roadway lane for the distant rearwardly approaching vehicle 56 in FIG. 4, an 'approximate' information that the vehicle is approaching from the rear direction must be determined even when the sensor field-of-view is extremely large (e.g. 150 degrees, for use in rear and side areas). This result is obtained by constructing the antenna for the rear sensor 26 of the rear sensor unit 22, 24 so that only objects from the rearward direction are detected by the antenna, or by evaluating the angles while allowing a high degree of directional uncertainty, such as accurate to 30 degrees to determine, for example, that the distant rearwardly approaching vehicle 56 shown in FIG. 4 is approaching from the rear of the host vehicle 20. These determinations are performed by the electronic controller 28 and transmitted to the central controller 36 or angular information is transmitted to the central controller and the lane determination is performed thereat. In the arrangement shown in FIG. 4, a lane for the rearwardly approaching nearby vehicle 54 is determined, while no lane is determined for the distant rearwardly approaching vehicle 56. The lack of angular resolution typically occurs when the distant rearwardly approaching vehicle 56 is beyond a particular distance from the host vehicle 20 or due to other conditions. Thus, the central controller 36 is configured to obtain the distance and velocity of a rearwardly approaching vehicle from the electronic controller 28, and in some instances angular information including the lane of a rearwardly approaching vehicle. The central controller 36 advances to step 70.

At step 70, the central controller 36 determines relative velocity of the rearwardly approaching vehicles 54, 56 with respect to or in relation to the host vehicle 20 and advances to decision step 72.

At decision step 72, the central controller 36 determines if a rearwardly approaching vehicle is closing at a fast relative velocity and is within the same lane or one or two adjacent lanes of the host vehicle 20. Thus, the rearwardly approaching nearby vehicle 54 in FIG. 4 is classified as meeting these criteria. When the fast relative velocity is at or greater than a fast relative velocity threshold and the rearwardly approaching nearby vehicle 54 is in a relevant, adjacent lane or within two lanes on either side of a host vehicle lane of the host vehicle 20, the algorithm executed by the central controller 36 provides a fast rearwardly approaching vehicle output and advances to step 76.

At step 76, the central controller 36 determines if there is an augmented chance of collision with the rearwardly approaching nearby vehicle 54 if the host vehicle 20 moves to the left lane as follows. The relative velocity of the rearwardly approaching nearby vehicle 54, the distance of the nearby vehicle from the host vehicle and the lane of the nearby vehicle are utilized by the central controller 36 to determine, for example, whether a lane change would be risky (i.e. there is an accident potential) or whether a lane change is inappropriate (i.e. a reaction by the approaching nearby vehicle, like braking would be required), but the lane change can be performed if absolutely needed. For example, if the rearwardly approaching nearby vehicle 54 is so close that an augmented chance of collision exists, the program advances to step 80.

At step 80, the central controller 36 does not permit or prevents the vehicle drive control 40 from moving or steering the host vehicle 20 to perform a lane change into at least one of the two adjacent lanes, such as the left lane, under any conditions. The program then returns to step 62 to again determine the presence and relative velocity of rearwardly approaching vehicles.

Returning to step 76, if there is not an augmented chance of collision with the rearwardly approaching nearby vehicle 54 if the host vehicle 20 moves to the left lane, but a lane change is inappropriate (i.e. a reaction by the approaching nearby vehicle, like braking would be required), but the lane change can be performed if absolutely needed, the central controller advances to step 84. At step 84, the central controller 36 controls the vehicle drive control 40 to move the host vehicle 20 to the left lane if absolutely needed, for instance to avoid a collision with a vehicle in front of the host vehicle. Thereafter, the central controller 36 returns to step 62 to again determine the presence and relative velocity of rearwardly approaching vehicles in relation to the host vehicle 20.

Returning to decision step 72, when a vehicle approaching fast and within a same or adjacent identified lane is not present the program advances to step 88.

At step 88, the central controller 36 determines whether an approaching vehicle identified only as approaching from the rear is nearing the host vehicle 20 at or greater than an extremely fast relative velocity threshold, such as about 45 mph. There is no lane assigned for the distant approaching vehicle due to its distance from the host vehicle 20. The extremely fast velocity, however, means that the distant vehicle will advance to or overtake the host vehicle 20 in a short amount of time and thus a lane change likely is undesirable. When the approaching vehicle is approaching at or greater than the extremely fast relative velocity threshold, the central controller 36 outputs an extremely fast rearwardly approaching vehicle output and advances to step 76.

As discussed above, at step 76 the central controller 36 determines if there is an augmented chance of collision with the rearwardly approaching vehicle if the host vehicle 20 moves to the left lane. In this instance, only the relative velocity and distance of the distant rearwardly approaching vehicle 56 is utilized to determine an augmented chance of collision. When the relative velocity is extremely fast and the distance indicates a collision would likely occur, the central controller 36 advances to step 80 and does not permit a lane change under any circumstance. In one embodiment, the central controller 36 prevents a lane change into at least one adjacent lane of the roadway regardless of any other condition. Thereafter, the central controller 36 returns to step 62 and repeats the program.

Returning to step 76, when the central controller 36 determines that there is not an augmented chance of collision, the program advances to step 84 and will allow a lane change if absolutely necessary as discussed above. In some embodiments, a lane change to at least one adjacent lane, such as the left lane, typically is avoided even though there is not an augmented chance of collision. Thereafter, the central controller 36 returns to step 62 and restarts the program.

Finally, returning to step 88, in the event no vehicle is detected rearwardly of the host vehicle 20 moving at an extremely fast relative velocity, the central controller 36 advances to step 92. At step 92, the central controller 36 allows a lane change, and thus permits moving or steering of the host vehicle 20 to the left lane as desired. Thereafter, the central controller 36 returns to step 62 to re-execute the program.

Decision step 72 and the subsequent steps are separately executed for every rearwardly approaching vehicle 54, 56 that is detected by the rear sensor units 22, 24 of the host vehicle 20.

In another embodiment, the central controller 36 determines autonomous control of the host vehicle 20 in response to the fast rearwardly approaching vehicle output or the extremely fast rearwardly approaching vehicle output, and other information from the host vehicle, such as host vehicle speed being above a certain threshold or below a different threshold. In one embodiment, the other information from the host vehicle adjusts the fast relative velocity threshold and the extremely fast relative velocity threshold.

Lane Assistance System Providing Warning

Figure 6:
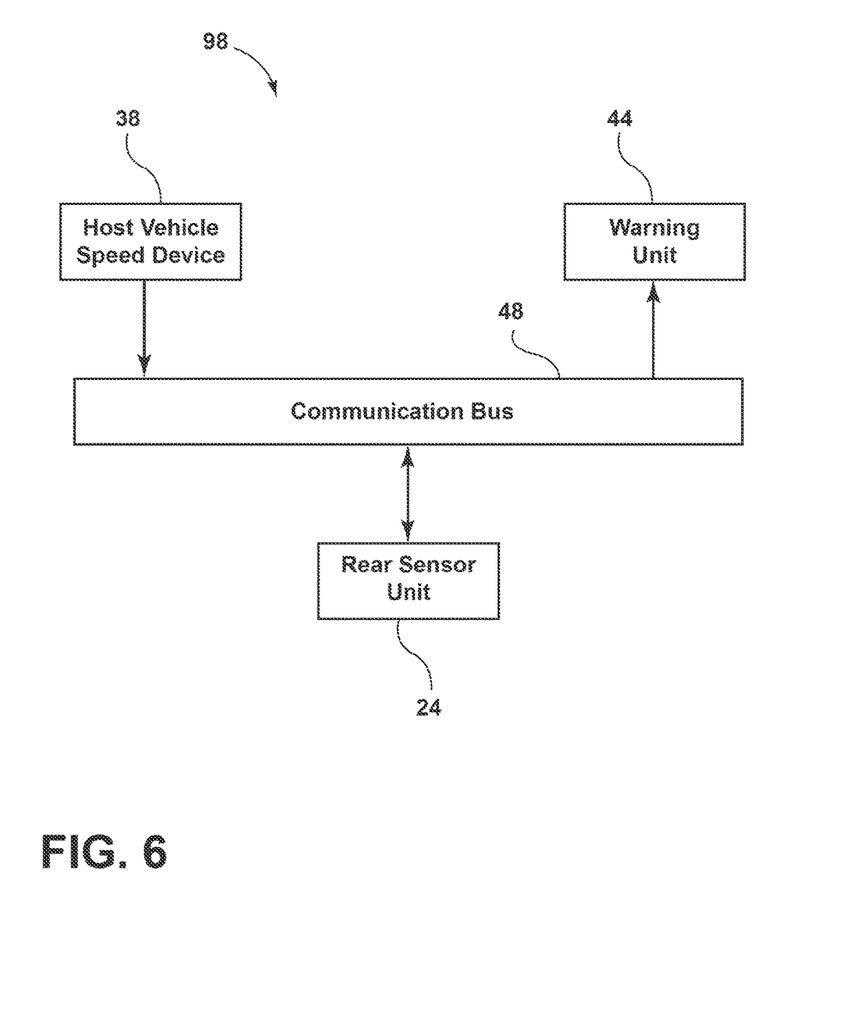
FIG. 6 is a block diagram of a lane assistance system for providing warnings to an operator.

The embodiment of FIG. 6 shows a lane assistance system 98 for providing audible and/or visual warnings to an operator of a host vehicle 20. The lane assistance system 98 includes a single rear sensor unit 24, although two or more sensor units are also contemplated. Further, FIG. 6 shows a host vehicle speed device 38, and a warning unit 44. The warning unit 44 provides an acoustic and/or a visual warning to a host vehicle operator with regard to rearwardly approaching vehicles. A communication bus 48 provides communication for the rear sensor unit 24 with the host vehicle speed device 38 and the warning unit 44. In this embodiment, the electronic controller 28 of the rear sensor unit 24 performs the processing analogous to the central controller 36 shown in the FIG. 3 embodiment, and provides commands or signals to the warning unit 44.

Operation of Lane Assistance for Vehicle Operator

Figure 7:
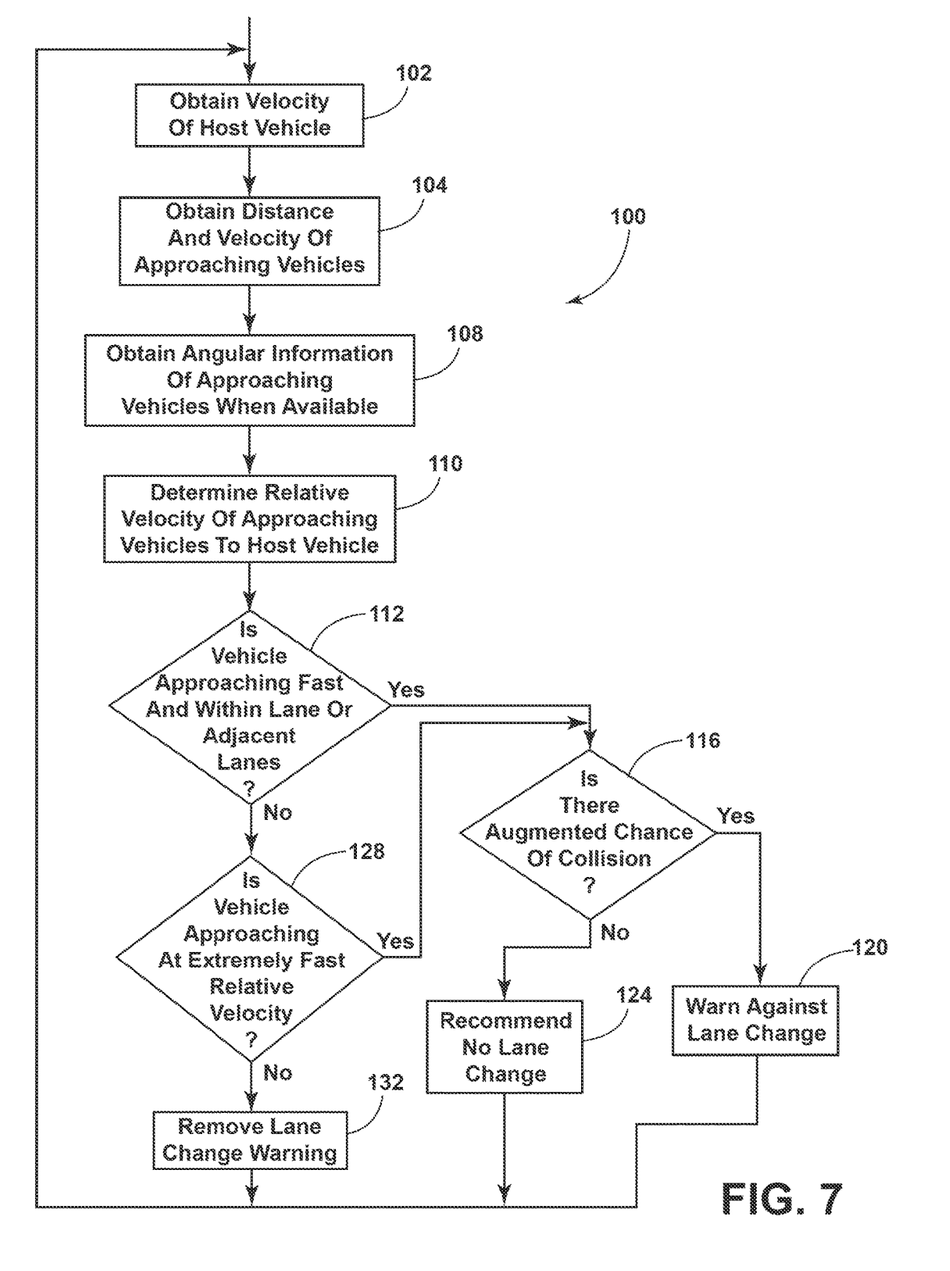
FIG. 7 is a flow chart for operation of the lane assistance system shown in FIG. 6.

FIG. 7 is a flowchart 100 of a routine or program that executes an algorithm. Thus, FIG. 7 sets forth in detail a method of operating the electronic controller 28 for providing lane assistance with the lane assistance system 98 shown in FIG. 6. The electronic controller 28 is configured to execute an algorithm that determines the presence of a rearwardly approaching vehicle moving toward the host vehicle 20.

In a first step 102, the electronic controller 28 receives host vehicle velocity information for the host vehicle 20 from the host vehicle speed device 38. The program advances to step 104.

At step 104, the rear sensor 26 senses at least one of a distance and a velocity of rearwardly approaching vehicles 54, 56 and provides signals to the corresponding electronic controller 28 that further calculates the distance or velocity, as necessary. In one embodiment, the electronic controller 28 determines the other of a distance and a velocity. The program advances to step 108.

At step 108, the electronic controller 28 determines angular information for the rearwardly approaching vehicles 54, 56 and, if possible, assigns a lane to the approaching vehicles. When there is a lack of angular resolution such that an adequate angle range is not available to determine a roadway lane for the distant rearwardly approaching vehicle 56 in FIG. 4, an 'approximate' information that the vehicle is approaching from the rear direction must be determined even when the sensor field-of-view is extremely large (e.g. 150 degrees, for use in rear and side areas). The lack of angular resolution typically occurs when a distant rearwardly approaching vehicle 56 is beyond a particular distance from the host vehicle 20. These determinations are performed by the electronic controller 28. In the arrangement shown in FIG. 4, a lane for the rearwardly approaching nearby vehicle 54 is determined, while no lane is determined for the distant rearwardly approaching vehicle 56. The program advances to step 110.

At step 110, the electronic controller 28 determines relative velocity of the rearwardly approaching vehicles 54, 56 with respect to or in relation to the host vehicle 20 and advances to step 112.

At step 112, the electronic controller 28 determines if a rearwardly approaching vehicle is closing or nearing the host vehicle 20 at a fast relative velocity and is within the same lane, or one or two adjacent lanes of the host vehicle 20. Thus, the rearwardly approaching nearby vehicle 54 in FIG. 4 is classified as meeting these criteria. When the fast relative velocity is at or greater than a fast relative velocity threshold stored by the electronic controller 28 and the rearwardly approaching nearby vehicle 54 is in a relevant, adjacent lane, the algorithm executed by the electronic controller 28 provides a fast rearwardly approaching vehicle output and advances to decision step 116.

At decision step 116, the electronic controller 28 determines if there is an augmented chance of collision with the rearwardly approaching nearby vehicle 54 if the host vehicle 20 moves to the left lane as follows. The relative velocity of the rearwardly approaching nearby vehicle 54, the distance of the nearby vehicle from the host vehicle and the lane of the nearby vehicle are utilized by the electronic controller 28 to determine, for example, whether a lane change would be risky (i.e. there is an accident potential) or whether a lane change is inappropriate (i.e. a reaction by the approaching nearby vehicle, like braking would be required), but the lane change can be performed if absolutely needed. For example, if the rearwardly approaching nearby vehicle 54 is so close that an augmented or increased critical likelihood of collision exists, the program advances to step 120.

At step 120, the electronic controller 28 provides an enhanced warning signal or command to the warning unit 44 indicating to the operator of the host vehicle 20 not to steer toward the left lane under any circumstances. In one embodiment, the warning is amplified if the vehicle drive control 40 indicates steering or movement of the host vehicle 20 toward the left lane due the presence and relative velocity of the rearwardly approaching nearby vehicle 54. The warning is intended to prevent the operator of the host vehicle 20 from steering into an inappropriate roadway lane. The program then returns to step 102 to again determine the presence and relative velocity of rearwardly approaching vehicles.

Returning to decision step 116, if there is not an augmented likelihood of collision with the rearwardly approaching nearby vehicle 54 if the host vehicle 20 moves to the left lane, but a lane change is inappropriate (i.e. a reaction by the rearwardly approaching nearby vehicle 54, like braking would be required), but the lane change can be performed if absolutely needed, the central controller 36 advances to step 124.

At step 124, the electronic controller 28 provides a warning signal or command to the warning unit 44. The warning unit 44 provides an audio and/or visual indication to the host vehicle operator warning against steering the host vehicle 20 to the left lane unless absolutely needed, for instance to avoid a collision with a vehicle in front of the host vehicle. In one embodiment, the enhanced warning includes visual and audio warnings that a particular lane change or lane changes must be avoided. In another embodiment, the warning includes only a visual warning. Thereafter, the electronic controller 28 returns to step 102 to again determine the presence and relative velocity of rearwardly approaching vehicles.

Returning to decision step 112, when a vehicle approaching fast and within a same or adjacent identified roadway lane is not present the program advances to step 128.

At step 128, the electronic controller 28 determines whether an approaching vehicle identified only as approaching from the rear is approaching at or greater than an extreme fast relative velocity threshold. There is no roadway lane assigned for the distant rearwardly approaching vehicle 56 due to its distance from the host vehicle 20. The extremely fast relative velocity, however, means that the distant rearwardly approaching vehicle 56 will reach or overtake the host vehicle 20 in a small amount of time and thus a lane change by the host vehicle is undesirable. Upon meeting or exceeding the extremely fast relative velocity threshold, the electronic controller 28 provides an extremely fast rearwardly approaching vehicle output and advances to decision step 116.

As discussed above, at decision step 116 the electronic controller 28 determines if there is an augmented chance of collision with the rearwardly approaching vehicle if the host vehicle 20 moves to the left lane. In this instance, only the relative velocity and distance of the distant rearwardly approaching vehicle 56 is utilized to determine an augmented chance of collision. When the relative velocity is extremely fast and the distance indicates a collision would likely occur, the electronic controller 28 advances to step 120 and provides an enhanced warning against a lane change under any circumstance. Thereafter, the electronic controller 28 returns to step 102 and repeats the program.

Returning to decision step 116, when the electronic controller 28 determines that there is not an augmented chance of collision, the program advances to step 124. At step 124, the electronic controller 28 provides a warning signal or command to the warning unit 44. The warning unit 44 provides an audio and/or visual indication to the host vehicle operator warning against steering the host vehicle 20 toward at least one adjacent lane, such as the left lane, unless absolutely needed, for example to avoid a collision with a vehicle in front of the host vehicle. Thereafter, the electronic controller 28 returns to step 102 and restarts the program.

Finally, returning to step 128 in FIG. 7, in the event no vehicle is detected rearwardly of the host vehicle 20 moving at an extremely fast relative velocity, the electronic controller 28 advances to step 132. At step 132, the electronic controller 28 does not provide any indication or warning with regard to a lane change. Further, if necessary, the electronic controller 28 sends a clear signal or message to the warning unit 44 to ensure that no audio or visual warning is output to an operator of the host vehicle 20 with regard to lane changes. Thereafter, the electronic controller 28 returns to step 102 to re-execute the program.

While a single rear sensor unit 24 is shown in FIG. 6 an embodiment with a plurality of rear sensor units is also contemplated. While the electronic controller 28 of the rear sensor unit 24 performs all of the processing for the embodiment shown in FIGS. 6 and 7, in some embodiments, other controllers process at least some of the steps shown in FIG. 7.

In one embodiment for autonomous driving shown in FIGS. 3-5, steps 68 and 70 are determined by a classifier that determines whether there are one or more fast approaching vehicles from behind a host vehicle, without requiring an explicit lane assignment for the approaching vehicles. The classifier observes the distance and velocities of vehicles (objects) located beyond the maximum distance where angular information is reliable. The classifier then reports the measured and calculated information to the central controller 36. In one embodiment, the classifier also use at least one of a distance and a relative velocity to determine whether a lane change would be risky (i.e. there is an accident potential) or whether a lane change is inappropriate (i.e. a reaction of an approaching vehicle, like braking would be required), but the lane change can be performed if absolutely needed. The classifier is a controller, such as a processor, not shown in the drawings. In another embodiment, the classification is performed by the electronic controller 28 of one of the rear sensor units 22, 24.

In general, the behavior described above indicates what the driver of the host vehicle will do. If there is an extremely fast rearwardly approaching vehicle in at least one neighboring lane, a lane change is undesirable and dangerous. If there is an extremely fast rearwardly approaching vehicle in the same lane as the host vehicle, then the extremely fast rearwardly approaching vehicle is likely intending to do a lane change, and the host vehicle best not to change to a lane where the approaching vehicle is likely to go. If there is an extremely fast vehicle two lanes over, then there is a possibility that this fast vehicle may make a lane change into the neighboring lane, and the host vehicle typically avoids changing lanes toward the fast approaching vehicle.

In one embodiment, the extremely fast relative velocity threshold is at least about 45 miles per hour and the fast relative velocity threshold is a value within a range from about 10 miles per hour to about 25 miles per hour. In another embodiment, the extremely fast relative velocity threshold is at least about 60 miles per hour and the fast relative velocity threshold is a value from between about 10 miles per hour and about 35 miles per hour. In one embodiment, the fast relative velocity threshold is about 20 miles per hour.

While FIG. 7 shows the decision steps 112 and 128 both advancing to decision step 116 in view of a "yes" condition, the decision steps 128 may advance to a different decision block (not shown). Regardless, upon determining an extremely fast relative velocity while the position or lane of the closing rearwardly approaching vehicle is not known, the assistance system 10 warns against or operates an autonomous host vehicle to resist a lane change in either adjacent lane of the autonomous host vehicle.

Finally, when the lane of an extremely fast approaching vehicle is known, the electronic controller 28 or central controller 36 operates to provide a warning or control based on the lane of the extremely fast approaching vehicle.

Thus, the invention provides, among other things, an arrangement to determine autonomous or driver controlled lane changes by a host vehicle 20 having rear radar or lidar sensing, during sensing of a fast or extremely fast rearwardly approaching vehicle.

What is claimed is:

1. A lane assistance system for providing a fast rearwardly approaching vehicle output or an extremely fast rearwardly approaching vehicle output in response to a rearwardly approaching vehicle nearing a host vehicle, the system comprising:
    at least one rear sensor unit disposed proximate to a rear of the host vehicle, the at least one rear sensor unit configured to detect at least one of a distance and a velocity of a rearwardly approaching vehicle moving toward the host vehicle; and
    an electronic controller configured to:
        obtain host vehicle velocity information,
        obtain at least one of a distance and a velocity of a rearwardly approaching vehicle,
        determine a relative velocity of a rearwardly approaching vehicle in relation to the host vehicle;
        when a lane of a rearwardly approaching vehicle is obtained via the at least one rear sensor unit,
            upon determining that (a) a rearwardly approaching vehicle is within at least one neighboring lane on either side of a host vehicle lane that the host vehicle is traveling in, and (b) the relative velocity indicates a rearwardly approaching vehicle is approaching the host vehicle at or greater than a fast relative velocity threshold, providing the fast rearwardly approaching vehicle output,
        when a lane of a rearwardly approaching vehicle is not determinable due to a lack of angular resolution for the rear sensor unit,
            upon determining that a rearwardly approaching vehicle has a relative velocity that is at or greater than an extremely fast relative velocity threshold, providing the extremely fast rearwardly approaching vehicle output.

2. The assistance system according to claim 1, wherein the electronic controller is provided within the rear sensor unit that includes a rear radar sensor for sensing a velocity of a rearwardly approaching vehicle, and wherein the lack of angular resolution occurs when a rearwardly approaching vehicle is beyond a particular distance from the host vehicle.

3. The assistance system according to claim 2, wherein the fast rearwardly approaching vehicle output and the extremely fast rearwardly approaching vehicle output are provided to a warning unit for providing a warning to an operator of the host vehicle in response to the fast rearwardly approaching vehicle output or the extremely fast rearwardly approaching vehicle output.

4. The assistance system according to claim 3, wherein the warning comprises at least one of an acoustic warning and a visual warning, and in response to the fast rearwardly approaching vehicle output, the warning indicates a particular lane change that must be avoided.

5. The assistance system according to claim 3, wherein in response to the extremely fast rearwardly approaching vehicle output, the warning indicates that a lane change is inappropriate.

6. The assistance system according to claim 1, wherein the electronic controller is a central controller that determines autonomous control of the host vehicle in response to the fast rearwardly approaching vehicle output or the extremely fast rearwardly approaching vehicle output, and other information from the host vehicle.

7. The assistance system according to claim 1, wherein the at least one rear sensor unit is a left rear sensor unit, the assistance system including a right rear sensor unit.

8. The assistance system according to claim 7, wherein the left rear sensor unit and the right rear sensor unit are lidar rear sensor units that determine a distance of a rearwardly approaching vehicle from the host vehicle, and wherein the electronic controller determines the relative velocity from detected changes in distance between the host vehicle and a rearwardly approaching vehicle.

9. The assistance system according to claim 1, wherein the extremely fast relative velocity threshold is at least about 45 miles per hour.

10. The assistance system according to claim 9, wherein the fast relative velocity threshold is a value within a range from at least about 10 miles per hour to about 25 miles per hour.

11. A method for providing a fast rearwardly approaching vehicle output or an extremely fast rearwardly approaching vehicle output in response to a rearwardly approaching vehicle nearing a host vehicle, the method comprising:

obtaining at least one of a distance and a velocity of a rearwardly approaching vehicle;

determining a relative velocity of a rearwardly approaching vehicle in relation to the host vehicle;

when a lane of a rearwardly approaching vehicle is obtained via the at least one rear sensor unit, providing the fast rearwardly approaching vehicle output upon determining that a rearwardly approaching vehicle is within at least one neighboring lane on either side of a host vehicle lane that the host vehicle is driving in and that the relative velocity indicates a rearwardly approaching vehicle is approaching the host vehicle at or greater than a fast relative velocity threshold; and when a lane of a rearwardly approaching vehicle is not determinable due to a lack of angular resolution for the rear sensor unit, providing the extremely fast rearwardly approaching vehicle output upon determining that a rearwardly approaching vehicle has a relative velocity that is at or greater than an extremely fast relative velocity threshold.

12. The method according to claim 11, including obtaining host vehicle velocity information, and wherein obtaining at least one of a distance and a velocity of a rearwardly approaching vehicle is provided by a rear radar sensor unit, and wherein the angular resolution for the rear sensor unit is not determinable when a rearwardly approaching vehicle is beyond a particular distance from the host vehicle.

13. The method according to claim 12, including providing a warning to an operator of the host vehicle in response to the fast rearwardly approaching vehicle output or the extremely fast rearwardly approaching vehicle output.

14. The method according to claim 13, wherein the warning comprises at least one of an acoustic and visual warning, and in response to the fast rearwardly approaching vehicle output, the warning indicates a lane change to at least one adjacent lane that must be avoided.

15. The method according to claim 13, wherein in response to the extremely fast rearwardly approaching vehicle output, the warning indicates that a lane change is inappropriate.

16. The method according to claim 11, including providing autonomous control of the host vehicle in response to the fast rearwardly approaching vehicle output or the extremely fast rearwardly approaching vehicle output.

17. The method according to claim 16, including preventing the host vehicle from performing a lane change into either adjacent lane in response to the extremely fast rearwardly approaching vehicle output.

18. The method according to claim 16, including preventing the host vehicle from performing a lane change into at least one of two adjacent lanes in response to the fast rearwardly approaching vehicle output.

19. The method according to claim 16, including determining an augmented chance of collision and with the autonomous control preventing a lane change into at least one adjacent lane of the roadway regardless of any other condition.

20. The method according to claim 11, wherein the extremely fast relative velocity threshold is at least about 45 miles per hour and the fast relative velocity threshold is a value within a range from at least about 10 miles per hour to about 25 miles per hour.

* * * * *